May 21, 1929.　　　　E. G. OAKLEY　　　　1,714,316
METHOD OF MAKING NUTS OR THE LIKE
Filed July 5, 1923　　　3 Sheets-Sheet 1
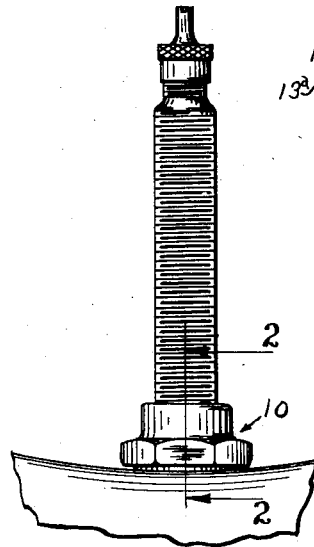
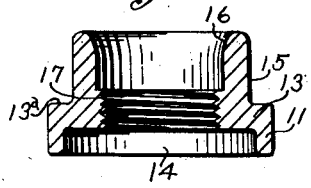
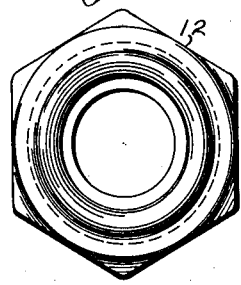
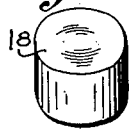
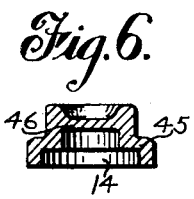
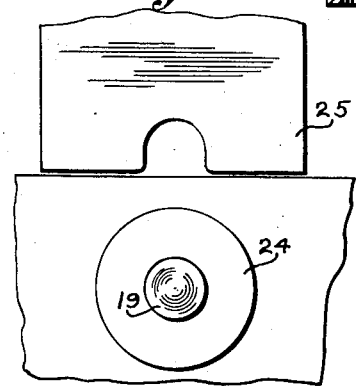
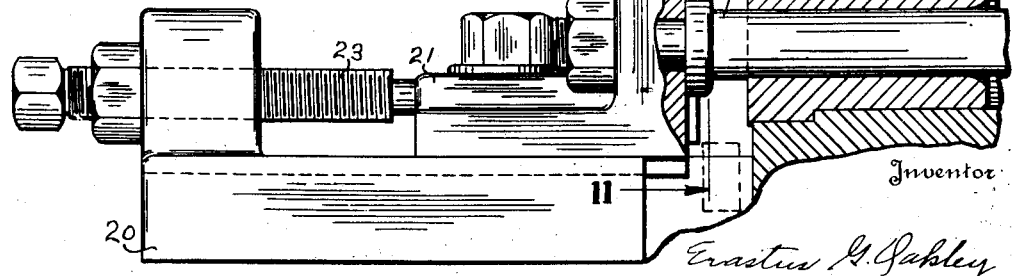
Inventor
Erastus G. Oakley
By Henry F. Rockwell
Attorney May 21, 1929.   E. G. OAKLEY   1,714,316
METHOD OF MAKING NUTS OR THE LIKE
Filed July 5, 1923   3 Sheets-Sheet 2
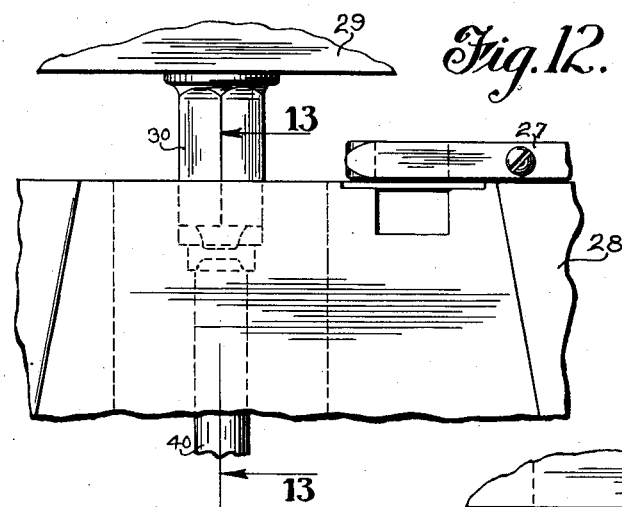
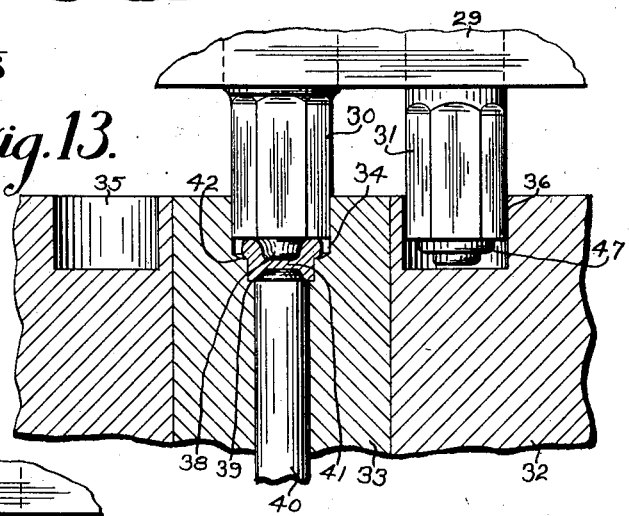
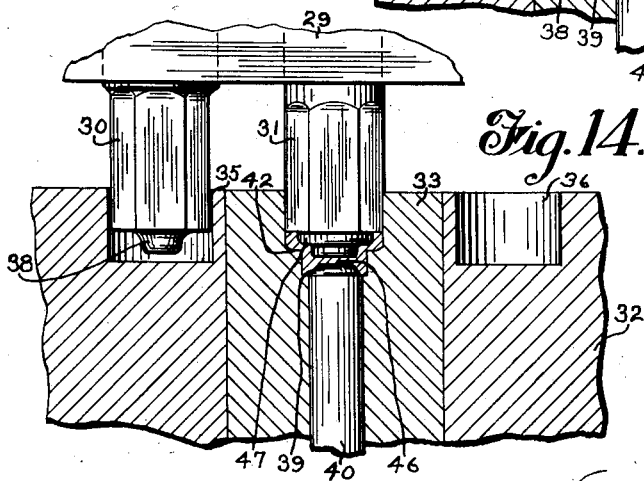

May 21, 1929.  E. G. OAKLEY  1,714,316
METHOD OF MAKING NUTS OR THE LIKE
Filed July 5, 1923   3 Sheets-Sheet 3
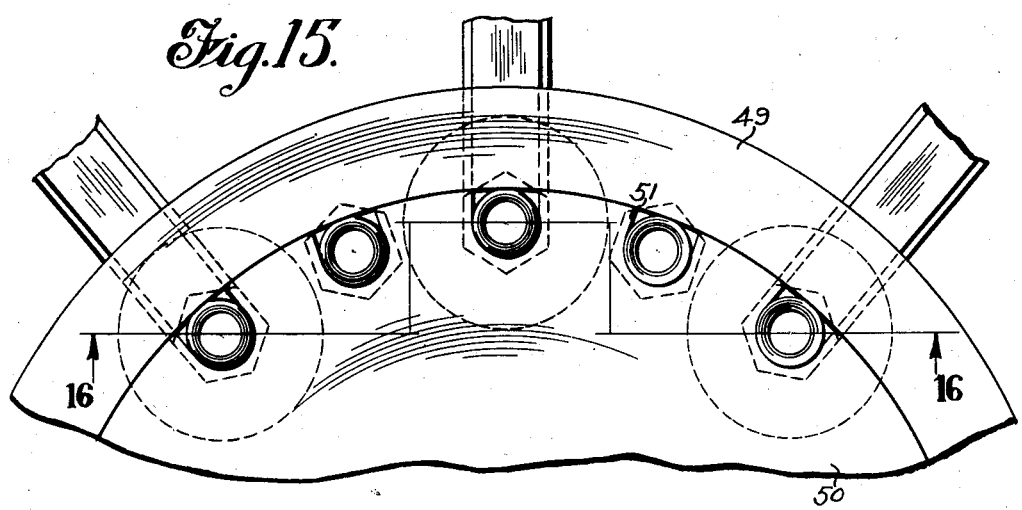
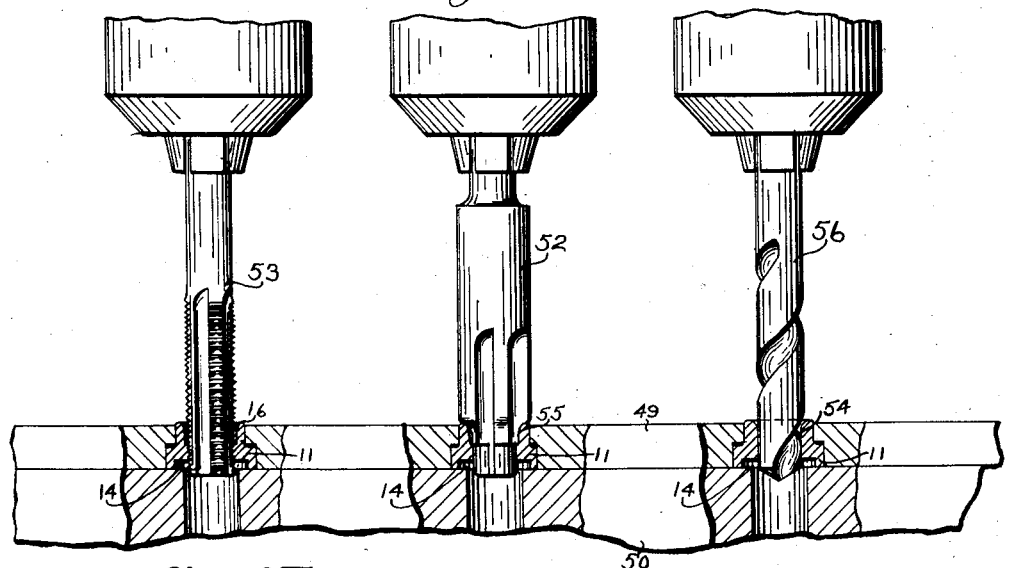
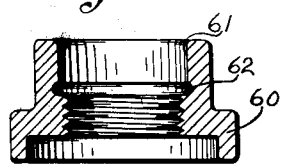

Patented May 21, 1929.

1,714,316

UNITED STATES PATENT OFFICE.

ERASTUS G. OAKLEY, OF SOUTHPORT, CONNECTICUT, ASSIGNOR TO BRIDGEPORT BRASS COMPANY, OF BRIDGEPORT, CONNECTICUT.

METHOD OF MAKING NUTS OR THE LIKE.

Application filed July 5, 1923. Serial No. 649,670.

This invention relates to a method of making nuts or the like, and more particularly to the manufacture of nuts by a drawing or stamping process so as to effect a considerable saving of metal over processes in use at the present time.

While I have illustrated a preferred form of my invention as applied to the production of a nut for tire valve stems having certain characteristics not present in common bolt nuts, it will be understood that my improved method is not limited to the manufacture of the particular article described herein but is applicable to nuts of other descriptions.

One object of my invention is to improve the method of manufacturing nuts now in common use by the provision of a simpler method which is likewise more economical. Another object of my invention is the provision of a new and improved method of manufacturing nuts which effects a saving in the metal required as well as a saving in the labor to be performed.

A still further object of my invention is to provide a new and improved method of producing a nut from a blank by a series of drawing processes by which the nut is formed with scarcely any wastage of material.

More specifically my invention relates to a method of making a nut from a blank comprising a piece of solid bar stock by pressing or drawing the metal of the blank from the central part thereof to form the opening in the nut and causing the displaced metal to flow outwardly into the body of the nut and against the wall of a die opening of suitable shape to give the proper exterior form to the finished article. The nut may then be finished by a few simple mechanical operations.

To these and other ends, the invention consists in the new and improved process to be hereinafter described and claimed.

In the accompanying drawings:

Fig. 1 is an elevational view of a valve stem having thereon a nut produced by my improved method;

Fig. 2 is a sectional view of the nut on line 2—2 of Fig. 1;

Fig. 3 is a top plan view of the nut;

Fig. 4 shows, in its preferred form, the slug blank from which the nut is made;

Fig. 5 is a sectional view of the blank after the first drawing operation has been performed thereon;

Fig. 6 is a similar view illustrating the appearance of the blank after a further operation;

Fig. 7 illustrates the appearance of the blank after the web has been bored out to complete the opening through the blank;

Fig. 8 is a sectional view similar to Fig. 7, showing the nut after the counter-boring operation has been performed;

Fig. 9 is a sectional view of the finished nut after the interior threads have been cut;

Fig. 10 is a view partly in side elevation and partly in section of the apparatus used for preparing the blanks;

Fig. 11 is a fragmentary front elevational view of some of the parts shown in Fig. 10, the view being taken on line 11—11 of Fig. 10;

Fig. 12 is a front view of the header press used for forming the blank into the required shape for the finished nut;

Fig. 13 is a sectional view on line 13—13 of Fig. 12, showing one of the drawing operations;

Fig. 14 is a view similar to Fig. 13, but illustrating a further drawing operation;

Fig. 15 is a plan view of the dial press used in completing the manufacture of the nut;

Fig. 16 is a sectional view on the broken lines 16—16 of Fig. 15, and

Fig. 17 shows a modified form of nut.

The valve stem nut which I have selected to illustrate as one of the products which may be manufactured by my improved method, is designated generally by the numeral 10 in Fig. 1, and may consist of a head or body portion 11 usually polygonal in form so as to provide the wrench faces 12 and a flat portion 13 which forms with the body portion 11 an annular recess or bottom cavity 14, and an exterior shoulder 13ª. Above, and as shown in this instance, preferably integrally formed with the body portion of the nut is a cylindrical extension 15, the mouth of which is internally flared or counter-bored as at 16, and adjacent the cavity 14 the bore of the nut is internally threaded as at 17 so as to take into the threads of the bolt or stem upon which the nut is secured. It will, of course, be understood that while the upper extension 15 and bottom cavity 14 are important features in the particular combination shown in the drawing, the invention is not limited in all of its aspects to the production of a nut possessing these characteristics.

In my improved process I prefer to use a blank consisting of a solid metal slug 18 shown in Fig. 4, which may be advantageously prepared by being cut from a length of wire or rod 19.

In Figs. 10 and 11 I have shown in a somewhat fragmentary way the preferred apparatus used for cutting the slug blanks from the solid rod 19, and this apparatus may consist of a press upon which is mounted a fixture 20 which slidably carries a stop block 21 in which is mounted an abutment 22, against which the end face of the rod 19 may be fed. The block 21 may be slidably adjusted in ways in the fixture 20 by means of the adjusting screw 23. The rod 19 is adapted to be carried in and fed through a work holder 24, the cutter 25 being brought down upon the projecting end of the rod by the press gate 26 to cut off the length required for the blank.

The blank may then be fed by means of a carrier 27 to a double stroke header press 28, shown in a fragmentary way in Figs. 12, 13 and 14. The ram 29 of this press is provided with the two punches 30 and 31 and in the press bed 32 is mounted a die 33, having a die opening 34 of the proper configuration. In the die bed are provided clearance openings 35 and 36 to receive the punches 30 and 31 upon the inoperative strokes of the latter.

The blank is carried to a position in front of the mouth of the die opening 34 by the carrier 27 and upon the first stroke of the press it is moved into the opening by the punch 30. The punch is provided with a forming projection 38 upon its lower face which upon the stroke of the press makes a relatively deep impression or recess in the face of the blank and flares outwardly the blank wall around this recess. In the bottom of the die opening is disposed a forming projection 39 on the upper end of the knock out punch 40, which likewise impresses the opposite face of the blank so that as clearly shown in Figs. 5 and 13 a thin transverse web of metal 41 remains. The die opening 34 is reduced in size at the lower portion thereof to provide the shoulder 42. The die opening above this shoulder is polygonal in shape so as to properly form the wrench faces upon the nut, as will be hereinafter described, and below the shoulder, is cylindrical in shape so as to form the extension 15 upon the nut. In Fig. 5 of the drawings the blank 44 is shown in the form produced by the first stroke of the press.

Upon the second stroke of the header press wherein the blank is operated upon by the punch 31, it is further formed as shown at 45 in Fig. 6, wherein the cavity 14 is formed in its finished shape and the web 41 is further thinned to provide the web 46. The punch 31 is provided with the shouldered working projection 47, which is brought down into the cavity formed in the outer face of the blank by the punch 30, the smaller projecting portion of the punch coming down against the web 41 to further thin out this web and to further form the internal bore in the blank. The upper shouldered portion of the projection on the punch 31 forms the cavity 14 within the head of the finished nut and presses the wall of the head outwardly against the polygonal faces of the die opening to form the wrench faces 12. After this operation has been completed the exterior of the nut is then in its finished form and it only remains to complete its manufacture by certain operations upon the nut bore.

The blanks 45 as they emerge from the header press are fed into a dial press 49, shown in Fig. 15. The dial 50 of the press is provided with openings 51 through which the upper portions of the blanks project to be operated upon by the press tools. The ram of the press is in this instance, adapted for the mounting of the rotating tools comprising a drill 56, a counter-boring and reaming tool 52, and the tap 53. It will be understood that in the case of the machine shown the three tools are brought down upon the work simultaneously so as to achieve an economy in operation, but as far as concerns any one blank the operations take place successively, the web 46 first being cut out by the drill 56. The bore of the nut is then reamed and counter-bored by the tool 52 and the threads 17 are then cut by the tap 53.

As stated above, the blanks 45 in the form shown in Fig. 6 are fed to the dial press wherein they are first operated upon by the drill 56. The result of this operation is to cut out the thin web 46 thus forming the internal bore 54 through the blank as shown in Fig. 7. Upon the rotation of the dial the blank is then brought into position to be operated upon by the reaming and counter-boring tool 52. The lower portion of the bore 54 is then reamed out preparatory to cutting the threads therein and the upper portion is counter-bored to provide the flared inner wall 55 shown in Fig. 8. The blank in this form is then brought into position to receive the tap 53 which cuts the threads 17 upon the lower portion of the bore adjacent the recess 14. The nut has now been completed in its finished form and is ready for use.

It will, of course, be understood that my process is not dependent upon the particular mechanism shown in the drawings for carrying out the preferred steps. Neither is it dependent in all cases upon the particular steps performed or the order of these steps as variations in this respect may be resorted to without departing from the spirit of the invention.

My improved method may be advantageously used in the manufacture of cap nuts or nuts wherein the threaded opening does not extend entirely through the nut to expose the end of the bolt upon which the nut is threaded. In this instance, the indentation or recess which receives the bolt will be made in one face of the nut only and the remaining web 46 will not be bored out but on the contrary the threaded opening will be left closed at one end. The shape of the die opening may, in such case, be varied according to the form desired of the nut to be made.

While I have shown and illustrated a preferred embodiment of my invention, it will be understood that it is not to be limited to the exact steps described or to the precise order of these steps but that various changes may be made and resort had to various modifications which will lie within the spirit of the invention and within the scope of the appended claims.

In Fig. 17 I have shown a modified form of nut 60, which may be made by my improved process. This nut is similar to the nut shown in Fig. 2, except that above the threaded portion the bore 61 is substantially uniform in diameter and is provided with an interior annular groove or channel 62. The bore 61 is preferably slightly larger than the threaded portion of the nut so as to clear the threads upon the valve stem.

What I claim is:

1. The method of making a nut or the like from a solid slug by a pressing or stamping process, which comprises indenting opposite faces of a piece of solid bar stock while confining a portion only of the length of the blank at one end thereof, and then flaring outwardly the wall about the indentation at the other face of the blank to form an enlarged bottom cavity, the indentations being of smaller circumference than the cavity and being separated by a thin web of metal, and then cutting out the web to perfect an opening through the nut.

2. The method of making a nut or the like from a slug by a pressing or stamping process, which comprises placing a section of round solid bar stock into a suitable die having a shouldered opening, which confines the blank for a portion of its length, and indenting the opposite faces of the blank and then pressing outwardly the wall of the indentation adjacent the unconfined end of the blank to form an enlarged head upon the blank having a cavity therein of larger diameter and shallower than the indentation at that side of the blank, and then cutting out the metal between said indentations to complete the opening through the nut.

3. The method of making a nut or the like from a slug by a pressing or stamping process, which comprises placing a section of round solid bar stock into a suitable die having a shouldered opening, which confines the blank for a portion of its length, and indenting the opposite faces of the blank, and then pressing outwardly the wall of the indentation adjacent the unconfined end of the blank to form an enlarged head upon the blank having wrench faces on the outside thereof and a cavity therein of larger diameter and shallower than the indentation at that side of the blank, and then cutting out the metal between said indentations to complete the opening through the nut.

4. The method of making a nut or the like from a slug by a pressing or stamping process, which comprises placing a section of round solid bar stock into a suitable die having a shouldered opening, which confines the blank for a portion of its length only and indenting the opposite faces of the blank, and then pressing outwardly the wall of the indentation adjacent the unconfined end of the blank to form an enlarged head upon the blank having wrench faces on the lateral edge thereof and a cavity therein of larger diameter and shallower than the indentation at that side of the blank, and then cutting out the metal between said indentations to complete the opening through the nut.

5. The method of making a nut or the like from a slug by a pressing or stamping process, which comprises cutting a blank from a piece of round solid bar stock, placing the blank in a suitable die which confines a portion only of the blank adjacent one end thereof, pressing outwardly the metal of the central part of the blank to form a deep impression therein at the unconfined end, forming a head upon this end of the blank having a cavity therein surrounding said impression, and then cutting away the bottom of the impression to complete the opening through the blank.

6. The method of making a nut or the like, which comprises cutting a blank from a piece of round solid bar stock, placing the blank in a suitable die which confines only a portion of the blank adjacent one end thereof, pressing outwardly the metal of the central part of the blank to form a deep impression therein, forming a head upon the unconfined end of the blank having a cavity therein surrounding said impression, and then cutting away the bottom of the impression to complete the opening through the blank, and then enlarging one portion and threading another portion of the opening so made.

7. The method of making a nut or the like, which comprises confining a portion only of a slug blank in a suitable die indenting the face of the blank adjacent an unconfined end, causing the metal about said indentation to flow outwardly to form an outwardly facing cavity in the face of the blank, impressing wrench faces upon the periphery of the blank about said cavity, cutting out the metal at the bottom of said indentation to perfect an opening through the blank, counter-boring said opening to provide a flaring mouth therefor and then threading said opening.

8. The method of making a nut or the like, which comprises placing a slug blank of circular cross section in a suitable die having a shoulder in the opening thereof, indenting both faces of said blank and causing the metal above the die shoulder to flow outwardly into contact with the wall of the die to form exterior wrench faces and an interior outwardly facing cavity about the indentation, cutting away the web of metal remaining between the indentations to perfect an opening through the blank, providing a flaring mouth in said opening and threading the same.

In witness whereof, I have hereunto set my hand this 30 day of June, 1923.

ERASTUS G. OAKLEY.